US012796857B2

(12) United States Patent
Wolbeck

(10) Patent No.: US 12,796,857 B2
(45) Date of Patent: Nov. 17, 2026

(54) BEVERAGE-PARAMETER SETTING ON A BEVERAGE MAKER

(71) Applicant: Miele & Cie. KG, Gütersloh (DE)

(72) Inventor: Michael Wolbeck, Gütersloh (DE)

(73) Assignee: MIELE & CIE. KG, Guetersloh (DE)

( * ) Notice: Subject to any disclaimer, the term of this patent is extended or adjusted under 35 U.S.C. 154(b) by 48 days.

(21) Appl. No.: 18/137,155

(22) Filed: Apr. 20, 2023

(65) Prior Publication Data

US 2023/0255396 A1 Aug. 17, 2023

Related U.S. Application Data

(62) Division of application No. 16/943,232, filed on Jul. 30, 2020, now abandoned.

(30) Foreign Application Priority Data

Aug. 28, 2019 (DE) ..................... 10 2019 123 007.1

(51) Int. Cl.
*A47J 31/52* (2006.01)
*A47J 31/40* (2006.01)

(52) U.S. Cl.
CPC ......... *A47J 31/5251* (2018.08); *A47J 31/402* (2013.01); *A47J 31/404* (2013.01); *A47J 31/5253* (2018.08); *A47J 31/5255* (2018.08)

(58) Field of Classification Search
CPC ................ A47J 31/5251; A47J 31/5253; A47J 31/5255; A47J 31/402; A47J 31/404; A47J 31/40; A47J 31/42; A47J 31/41; A47J 31/525
USPC .......................................... 99/280, 275, 279
See application file for complete search history.

(56) References Cited

U.S. PATENT DOCUMENTS

| | | | | |
|---|---|---|---|---|
| 9,113,749 | B2 * | 8/2015 | Castellani | G06Q 20/40145 |
| 9,591,862 | B2 * | 3/2017 | Kuempel | A23F 5/262 |
| 2018/0325307 | A1 * | 11/2018 | Stasch | A47J 31/5255 |
| 2019/0387920 | A1 * | 12/2019 | Anthony | A47J 31/5253 |
| 2021/0000290 | A1 * | 1/2021 | Savioz | G06F 3/0362 |

FOREIGN PATENT DOCUMENTS

DE 102017116485 A1 2/2018

* cited by examiner

*Primary Examiner* — Elizabeth M Kerr
*Assistant Examiner* — Alba T Rosario-Aponte
(74) *Attorney, Agent, or Firm* — Dickinson Wright PLLC

(57) ABSTRACT

A method for controlling a beverage maker involves the steps of preparing a first beverage having a first value of a beverage-preparation parameter, preparing a second beverage having a second value of the beverage-preparation parameter different than the first value, receiving a user input that selects the first or the second beverage, and storing the beverage-preparation parameter of the selected beverage as a specification for the preparation of the beverage. A beverage maker includes a beverage-preparation device with at least one variable beverage-preparation parameter, which can assume at least two different values, and a control device configured to carry out the method.

9 Claims, 2 Drawing Sheets

BEVERAGE-PARAMETER SETTING ON A BEVERAGE MAKER

RELATED APPLICATIONS

The present disclosure is a divisional application of U.S. application Ser. No. 16/943,232, filed on Jul. 30, 2020, which claims priority to and the benefit of German Application 10 2019 123 007.1, filed on Aug. 28, 2019, the entire contents of both of which are incorporated herein by reference.

TECHNICAL FIELD

The disclosure relates to a method for guided setting of parameters for the preparing of beverages using a beverage maker, as well as a corresponding beverage maker, in particular a fully automatic coffee machine.

BACKGROUND

Many users use a fully automatic coffee machine without setting the different parameters (amount of water, amount of grounds, water temperature, brewing time, pressure, pre-brewing, flow speed, amount of milk, milk foam consistency, etc.) for the respectively used coffee beans and their individual taste. The user often does not even know what influence the change of a certain parameter has on properties of the prepared coffee. The user therefore often leaves all or at least some of the predetermined settings of the machine unchanged, in particular the ones wherein he is not further able to estimate the effect.

In some cases, users will carry out a process in the manner of "trial and error", wherein they prepare multiple batches of coffee with different settings in order to find the optimal setting for them. They will often do this without understanding at all in which direction the change of a parameter primarily changes the taste, for example, with respect to the brewing temperature and the amount of bitter substances resulting therefrom. This is both time-consuming and error-prone, in particular since parameters can also influence one another.

The problem faced by the disclosure is thus to provide a method for a beverage maker as well as a corresponding beverage maker in order to make it possible for a user to systematically and efficiently effect parameter settings.

SUMMARY

According to one aspect a method for controlling a beverage maker is provided, comprising the following steps: preparing a first beverage having a first value of a beverage-preparation parameter; preparing a second beverage having a second value of the beverage-preparation parameter, which value differs from the first value; receiving a user input that indicates the first or the second beverage; and storing the beverage-preparation parameter of the specified beverage as a specification for the preparation of the beverage.

With the aid of the inventive method it is made possible for the users to set their perfect taste experience in beverages. For this purpose, the user is offered two identical beverage types, for example, coffee specialties, having respectively different parameter settings. These coffee specialties preferably each represent extremes with respect to the taste influenced by the parameter.

For example: Coffee #1 with pre-brewing, with high brewing temperature, larger amount of grounds, Coffee #2 without pre-brewing, with low brewing temperature, smaller amount of grounds. The user now decides which of the two coffees corresponds to his preference or at least comes closest thereto. Without having to know what influence the parameter has with respect to the taste, the user can thus set the parameter to his personal preference simply and purposefully. Based on the beverage specified by the user, the associated parameter is stored in the beverage maker as a specification.

It should be noted that the two beverages differ from each other specifically with respect to the different beverage-preparation parameter but must be identical in type in order to be able to establish a meaningful comparison. Beverage types are, for example, espresso, coffee, long coffee, or cappuccino.

In the context of this application, the term "beverage-preparation parameter" is to be understood such that it includes both individual parameters and a parameter set, i.e., a combination of two or more individual parameters. The brewing temperature or the amount of grounds would be an example of an individual parameter. The above-mentioned parameter set "with pre-brewing, with high brewing temperature, large amount of grounds" would be an example of a beverage-preparation parameter set. The term "value of a beverage-preparation parameter" is to be understood as corresponding to a single value, such as, for example, 86° C. or 92° C., or as a value combination such as, for example, "pre-brewing: yes, brewing temperature 90° C., amount of grounds 10 g."

According to one embodiment the method further comprises the following step: displaying a representation of the first and of the second beverage for the user input; wherein the step of displaying is carried out on a device display of the beverage maker or a mobile terminal coupled to the beverage maker; and the step of receiving the user input is carried out via an operating element of the beverage maker or from the coupled mobile terminal.

A simple and intuitive possibility for the user to specify which beverage tastes better is thereby offered by a display of the respective beverage to the user. For example, this can be affected via a touchscreen including a unique graphical illustration, wherein the touchscreen includes a touchscreen integrated in the beverage maker or of a mobile terminal such as smartphone or tablet or the like. Due to the intuitive input possibility the user need not have any prior knowledge about the relationships of beverage-preparation parameters and the resulting beverage.

According to one embodiment, the method further comprises, wherein the beverage-preparation parameter can assume more than two different values: receiving a user input that indicates the user request after a further adaptation of the beverage-preparation parameter; preparing a third beverage having a third value of the beverage-preparation parameter; preparing a fourth beverage having a fourth value of the beverage-preparation parameter; wherein the third and the fourth value differ from the stored value, wherein the difference is smaller than the difference between the first and the second value; receiving a user input that indicates the third or the fourth beverage; and storing the beverage-preparation parameter of the specified beverage as a specification for the preparation of the beverage.

The user can thereby further optimize a beverage-preparation parameter in an iterative manner, which beverage-preparation parameter can assume a value range or at least more than two values, provided the final satisfactory beverage has not yet been prepared in the first or preceding pass. In contrast thereto, a beverage-preparation parameter that can only assume two values, for example "with pre-brewing" and "without pre-brewing," cannot be further optimized.

According to one embodiment the beverage-preparation parameter includes one or more from the group consisting of: pre-brewing or no pre-brewing; brewing temperature; amount of grounds; brewing pressure; amount of water; and amount of milk.

According to a further aspect a beverage maker is provided, comprising: a beverage-preparation device including at least one variable beverage-preparation parameter that can assume at least two different values; and a control device that is configured to carry out a method as described above.

The beverage maker can in particular be a fully automatic coffee machine, and the beverage-preparation device can in particular be a brewing unit of the fully automatic coffee machine. Furthermore, the beverage-preparation device can also include further functions, such as, for example, the producing of heated or foamed milk for beverages such as cappuccino, etc.

According to one embodiment the beverage maker further comprises: a display element that is configured to display the first and the second beverage for a selection via the user input; and an operating element that is configured to receive a user input that indicates the first or the second beverage.

The display- and operating-elements can be embodied separately, but can also formed by a combined display-/operating-element. The display element can consist, for example, of corresponding LEDs, and the operating element or elements from sensor keys separate therefrom or combined therewith. In one preferred embodiment a touchscreen can form a combined display/operating element.

According to one embodiment the beverage maker further comprises a wireless interface that is configured for coupling to a mobile terminal; wherein the control device is configured to send a representation of the first and of the second beverage for the user input via the interface to the mobile terminal, and to receive a user input, which indicates the first or the second beverage, from the mobile terminal via the interface.

In one preferred embodiment the beverage maker comprises a wireless interface, via which a connection to a mobile terminal of the user can be produced. This includes both direct wireless connections between beverage maker and terminal and indirect connections via a router, a cloud, etc. For this purpose, in principle all known wireless connection technologies can be used, such as Bluetooth, ZigBee, 802.11 (WLAN), RFID, NFC, infrared.

It is thus possible to carry out the process of parameter setting using the display- and input-elements of the mobile terminal of the user, which can be more comfortable than those on the beverage maker itself. Conversely it is thereby possible to optionally provide only a simplified or reduced user interface on the beverage maker itself.

In one preferred embodiment the beverage maker is a fully automatic coffee machine, and the beverage-preparation parameter includes one or more from the group comprising: pre-brewing or no pre-brewing; brewing temperature; amount of grounds; degree of grinding; brewing pressure; amount of water; amount of milk; amount of milk foam; milk foam consistency; flow speed of the water.

The disclosure further relates to a system comprising a beverage maker as embodied above and a mobile terminal including a display element and an operating element for providing an operating- and display-device, preferably as a touch screen.

An exemplary embodiment of the disclosure is depicted purely schematically in the drawings and described in more detail below.

DETAILED DESCRIPTION OF THE DRAWINGS

Figure 1:
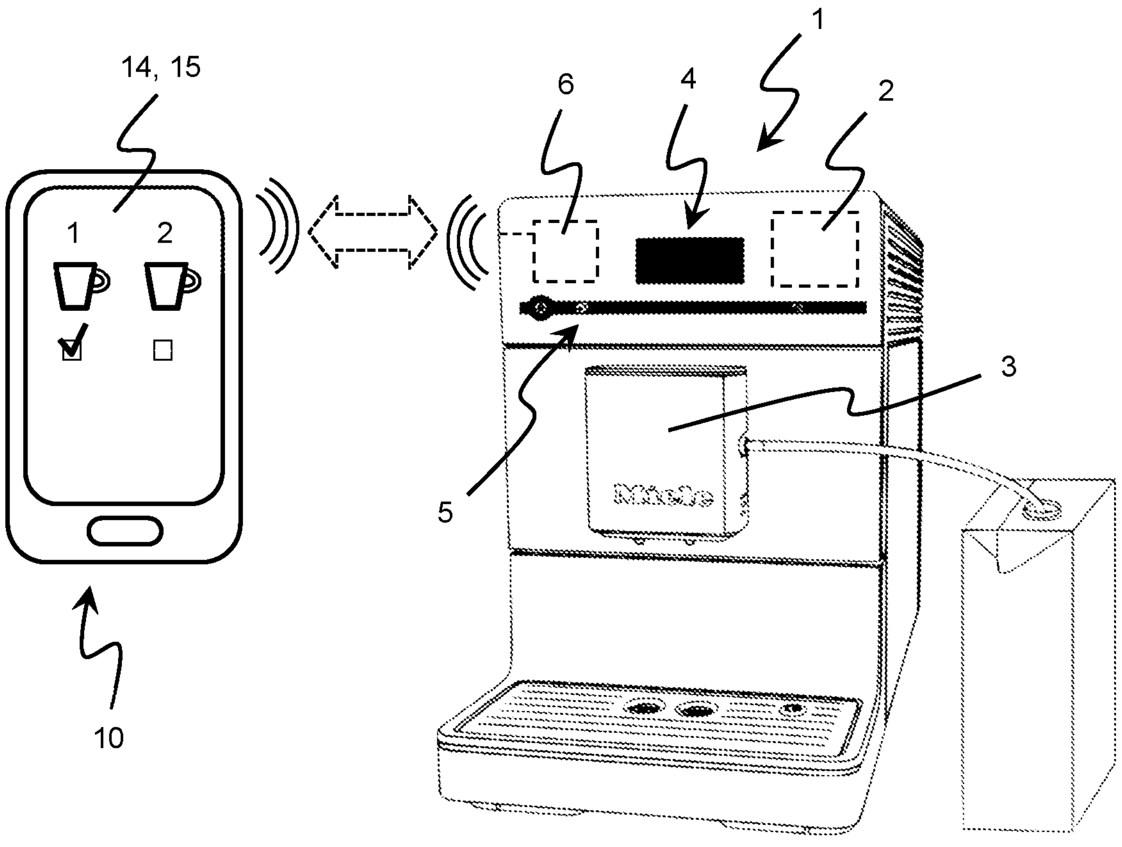
FIG. 1 shows an embodiment of an inventive beverage maker.

In FIG. 1 an inventive beverage maker 1, here a fully automatic coffee machine, is shown. The beverage maker 1 includes a beverage-preparation device 3 that has variable beverage-preparation parameters. These beverage-preparation parameters can comprise one or any combination of pre-brewing yes/no, brewing temperature, brewing pressure, amount of grounds, amount of water, amount of milk.

The beverage maker 1 further includes a control device 2, which is configured to prepare a first beverage and a second beverage of the same type. Possible beverage types are, for example, espresso, coffee, long coffee, or cappuccino. However, the two beverages differ in at least one beverage-preparation parameter, optionally also in multiple beverage-preparation parameters, so that differently tasting beverages of the same type can be prepared. For example, the first beverage is prepared at a low brewing temperature, and the second beverage at a high brewing temperature. Therefore beverages having different amounts of bitter substances arise. The user can now select the beverage tasting better and thus intuitively set the respective beverage type to this preference.

For this purpose, in a first embodiment, the beverage maker 1 includes a display element 4 in order to display the first and the second beverage to the user for a selection. Furthermore, it includes an operating element 5 in order to receive a user input that indicates the first or the second beverage. The display- and operating-elements 4, 5 shown here as separate units can also be combined in other embodiments, for example in the form of a touchscreen.

In FIG. 1 a second preferred embodiment is also shown, which can alternatively be provided on the beverage maker 1 instead of or also in addition to a display- and operating-element. For this purpose, the beverage maker 1 includes a wireless interface 6 in order to be coupled to a mobile terminal 10 of the user. For example, the wireless interface 6 can be a WLAN module.

The beverage maker 1 sends a representation of the first and of the second beverage to the mobile terminal 10 via the wireless WLAN connection (which generally runs over a WLAN router not shown here). On the mobile terminal 10, the user can now make his selection that is then sent back to the beverage maker 1 via the WLAN connection. The mobile terminal 10 comprises a touchscreen for providing the input element 15 and the display element 14. Contact surfaces are provided as input elements 15, which in the event of contact detect the corresponding beverage selection of the user, here, for example, beverage #1.

Regardless of the way in which the beverage maker 1 has received the selection, it can now store the parameter setting corresponding to the selected beverage type as a specification for the respective beverage type. In the future the user receives the beverage set according to his preference in the event of selection of the beverage type.

Figure 2:
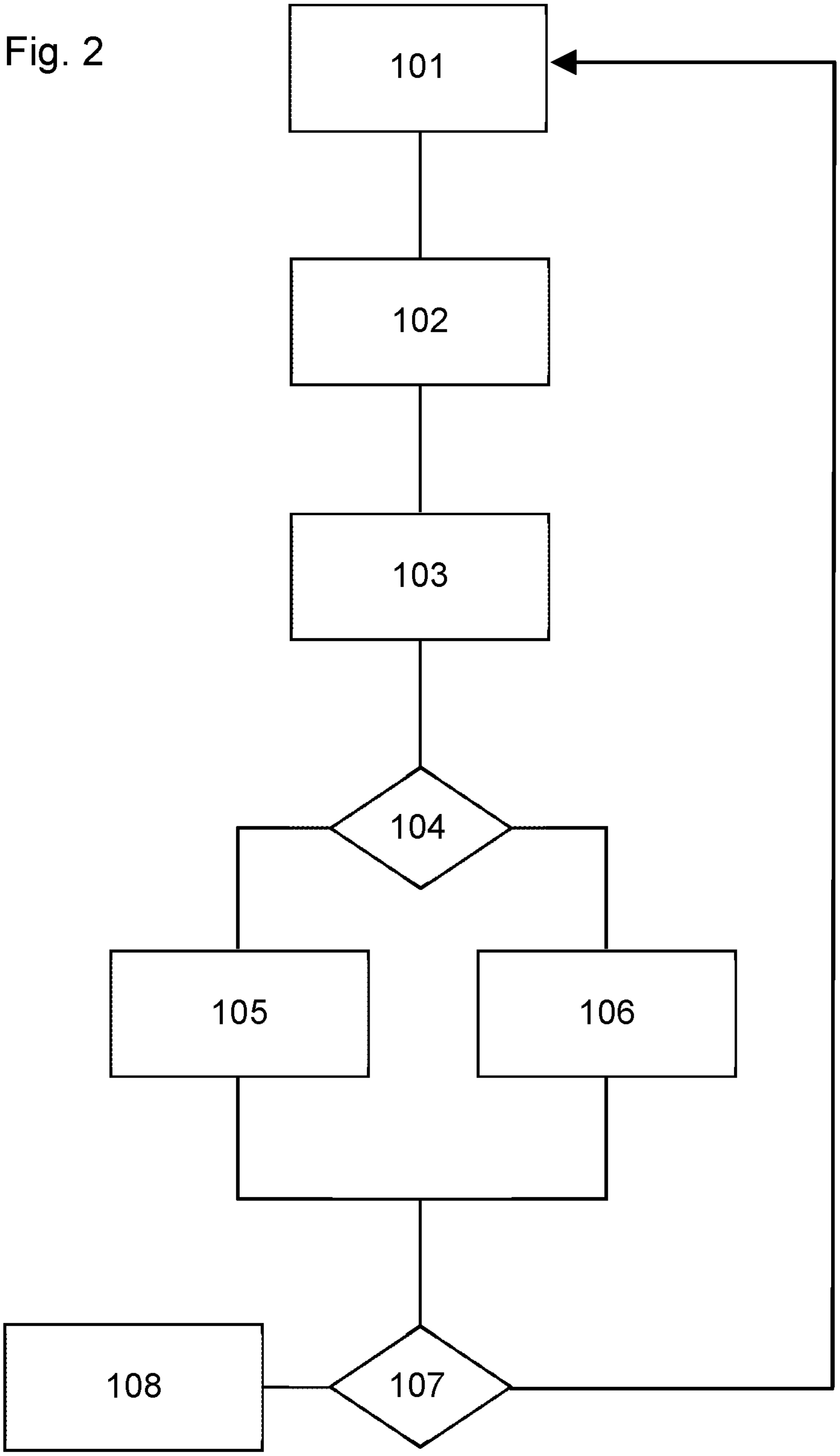
FIG. 2 shows a flow diagram of an embodiment of the inventive method.

FIG. 2 is a flow diagram of an embodiment of the inventive method that is embodied in a beverage maker. In step 101 a first beverage is prepared having a first value of a beverage-preparation parameter. In step 102 a second beverage is prepared having a second value of a beverage-preparation parameter. Both beverages are an identical beverage type such as, for example, espresso, coffee, coffee, long coffee, or cappuccino. Both beverages differ in at least one parameter relevant to the preparation, such as pre-brewing or no pre-brewing, brewing temperature, amount of grinding, brewing pressure, amount of water, or amount of milk. However, it is also possible that multiple or even all parameters differ in the two beverages.

In step 103 the first and of the second beverage are displayed in order to make possible a selection by a user. This can be affected either on a display of the beverage maker itself and/or on a mobile terminal coupled wirelessly to the beverage maker. In step 104 a user input is received, either directly using an operating element of the beverage maker or via the wireless coupling from the mobile terminal, which user input indicates the first or the second beverage.

Depending on the selection, in step 105 for the respective beverage type the parameter setting corresponding to the first selected beverage is stored as a setting for this beverage type, or in step 106 the parameter setting corresponding to the second selected beverage is stored.

In step 107 a query to the user can optionally occur whether he would like to end the optimization of the parameter setting or continue with it. If the user thus accepts the setting and does not want further optimization, the method ends in step 108. Otherwise if the user is not completely satisfied with the setting with respect to the beverage type, the method is repeated starting with step 101. Here for the further changing of the beverage-preparation parameter the previously achieved state, i.e., the beverage-preparation parameter corresponding to the selected beverage, is taken into account in the further optimization.

While the above description constitutes the preferred embodiments of the present disclosure, the disclosure is susceptible to modification, variation and change without departing from the proper scope and fair meaning of the accompanying claims.

What is claimed is:

1. A beverage maker to be operated by a user, the beverage maker being a fully automatic coffee machine, comprising:

an electronic controller that is programmed to cause the fully automatic coffee machine to:

prepare a first beverage of a beverage type using a first value of a beverage-preparation parameter;

prepare a second beverage of the beverage type using a second value of the beverage-preparation parameter, the second value differing from the first value;

display, on a display of the fully automatic coffee machine and/or on a mobile terminal coupled to the fully automatic coffee machine via a wireless interface, a representation of the first beverage and the second beverage to prompt the user for a user input that specifies whether the first beverage or the second beverage is a better match for a taste preference of the user;

receive the user input that specifies the first or the second beverage as a selected beverage; and store a selected value of the beverage-preparation parameter of the selected beverage as a specification for the preparation of the beverage type, the selected value being the first value when the user input specifies the first beverage, and being the second value of the beverage-preparation parameter when the user input specifies the second beverage.

2. The beverage maker according to claim 1, further comprising:

one or more sensor keys or a touchscreen, configured to receive the user input specifying the first or the second beverage.

3. The beverage maker according to claim 1, further comprising a-wireless interface configured to couple to a mobile terminal;

wherein the electronic controller is configured to send a representation of the first and of the second beverage for the user input via the wireless interface to the mobile terminal, and to receive the user input, which indicates the first or the second beverage, from the mobile terminal via the wireless interface.

4. The beverage maker according to claim 1, wherein the beverage-preparation parameter is selected from the group consisting of:

pre-brewing or no pre-brewing;
brewing temperature;
amount of grounds;
degree of grinding;
brewing pressure;
amount of water;
amount of milk;
amount of milk foam;
milk foam consistency; and
flow speed of the water.

5. A system, comprising the beverage maker according to claim 3 and the mobile terminal, wherein the mobile terminal includes a touchscreen configured to display the representation of the first and of the second beverage and to receive the user input.

6. The system according to claim 5, wherein the touchscreen provides a display element and an input element.

7. The beverage maker according to claim 1, wherein the first value and the second value of the beverage-preparation parameter are not directly inputted by the user.

8. The beverage maker according to claim 1, wherein the fully automatic coffee machine, upon the user operating the fully automatic coffee machine and selecting the beverage type, uses the stored specification to prepare the beverage.

9. The beverage maker according to claim 1, wherein the electronic controller is programmed to cause the fully automatic coffee machine to prepare the first beverage and the second beverage before displaying the representation of the first and of the second beverage to prompt the user for the user input.

* * * * *